US012681743B2

(12) United States Patent
Ye et al.

(10) Patent No.: US 12,681,743 B2
(45) Date of Patent: Jul. 14, 2026

(54) VIRTUAL MACHINE MANAGING SYSTEM USING SNAPSHOT

(71) Applicant: Citrix Systems, Inc., Fort Lauderdale, FL (US)

(72) Inventors: Shuai Ye, Nanjing (CN); Ke Xu, Nanjing (CN); Jian Luo, Nanjing (CN); Cheng Zhang, Nanjing (CN)

( * ) Notice: Subject to any disclaimer, the term of this patent is extended or adjusted under 35 U.S.C. 154(b) by 417 days.

(21) Appl. No.: 17/876,931

(22) Filed: Jul. 29, 2022

(65) Prior Publication Data

US 2024/0004685 A1     Jan. 4, 2024

Related U.S. Application Data

(63) Continuation of application No. PCT/CN2022/103324, filed on Jul. 1, 2022.

(51) Int. Cl.
G06F 9/455 (2018.01)
G06N 20/00 (2019.01)

(52) U.S. Cl.
CPC ......... G06F 9/45558 (2013.01); G06N 20/00 (2019.01); G06F 2009/4557 (2013.01)

(58) Field of Classification Search
CPC . G06F 2009/45562; G06F 2009/45575; G06F 9/45558
See application file for complete search history.

(56) References Cited

U.S. PATENT DOCUMENTS

| | | | |
|---|---|---|---|
| 8,726,337 B1 | 5/2014 | Curry et al. | |
| 8,880,687 B1 * | 11/2014 | Chandrachari | H04L 41/0816 |
| | | | 709/224 |
| 8,997,093 B2 | 3/2015 | Dimitrov | |
| 9,055,139 B1 | 6/2015 | Devireddy et al. | |
| 9,678,771 B2 | 6/2017 | Singleton, IV et al. | |
| 2008/0235285 A1 | 9/2008 | Della Pasqua | |
| 2009/0293056 A1 | 11/2009 | Ferris | |
| 2011/0029970 A1 | 2/2011 | Arasaratnam | |
| 2011/0145505 A1 | 6/2011 | Anand et al. | |

(Continued)

OTHER PUBLICATIONS

Cellular Disco: Resource Management Using Virtual Clusters on Shared-Memory Multiprocessors; Kinshuk Govil, et al.; Operating Systems Review, ACM (vol. 33, No. 5), Dec. 1999, pp. 154-169.

(Continued)

*Primary Examiner* — Schyler S Sanks

(57) ABSTRACT

Methods and systems for managing virtual machines are described herein. A virtualization computing platform may host a plurality of virtual machines comprising. The platform may detect that the first user device is disconnected from the first virtual machine and determine, using a machine learning model, that the first virtual machine, during a time period while the user device is disconnected, is in an idle state. The platform may obtain, based on the determination that the first virtual machine is in the idle state, a snapshot of the first virtual machine and cease hosting the first virtual machine. If the platform receives a request from a second user device associated with the same user account to continuing using the virtual application executed previously by the first virtual machine, the platform may establish a second virtual machine and load, to memory of the second virtual machine, information associated with the snapshot.

15 Claims, 12 Drawing Sheets

(56)                  References Cited

U.S. PATENT DOCUMENTS

| | | | |
|---|---|---|---|
| 2012/0173730 A1 | 7/2012 | Krumpe, Jr. | |
| 2013/0145367 A1 | 6/2013 | Moss et al. | |
| 2013/0227317 A1* | 8/2013 | Hyser .................. | G06F 1/3203 |
| | | | 713/300 |
| 2018/0336059 A1* | 11/2018 | Thomas ............... | G06F 9/5061 |
| 2020/0285503 A1* | 9/2020 | Dou ..................... | G06F 9/5072 |

OTHER PUBLICATIONS

Oct. 24, 2014 (WO) International Search Report and Written Opinion—App. PCT/US2014/049208.
Dec. 4, 2015—(US) Non-final Office Action—U.S. Appl. No. 13/955,213.
Feb. 25, 2016—(US) Final Office Action—U.S. Appl. No. 13/955,213.
Jul. 25, 2016—(US) Non-final Office Action—U.S. Appl. No. 13/955,213.
Oct. 20, 2016—(US) Final Office Action—U.S. Appl. No. 13/955,213.
Mar. 23, 2017—(US) Notice of Allowance—U.S. Appl. No. 13/955,213.

* cited by examiner

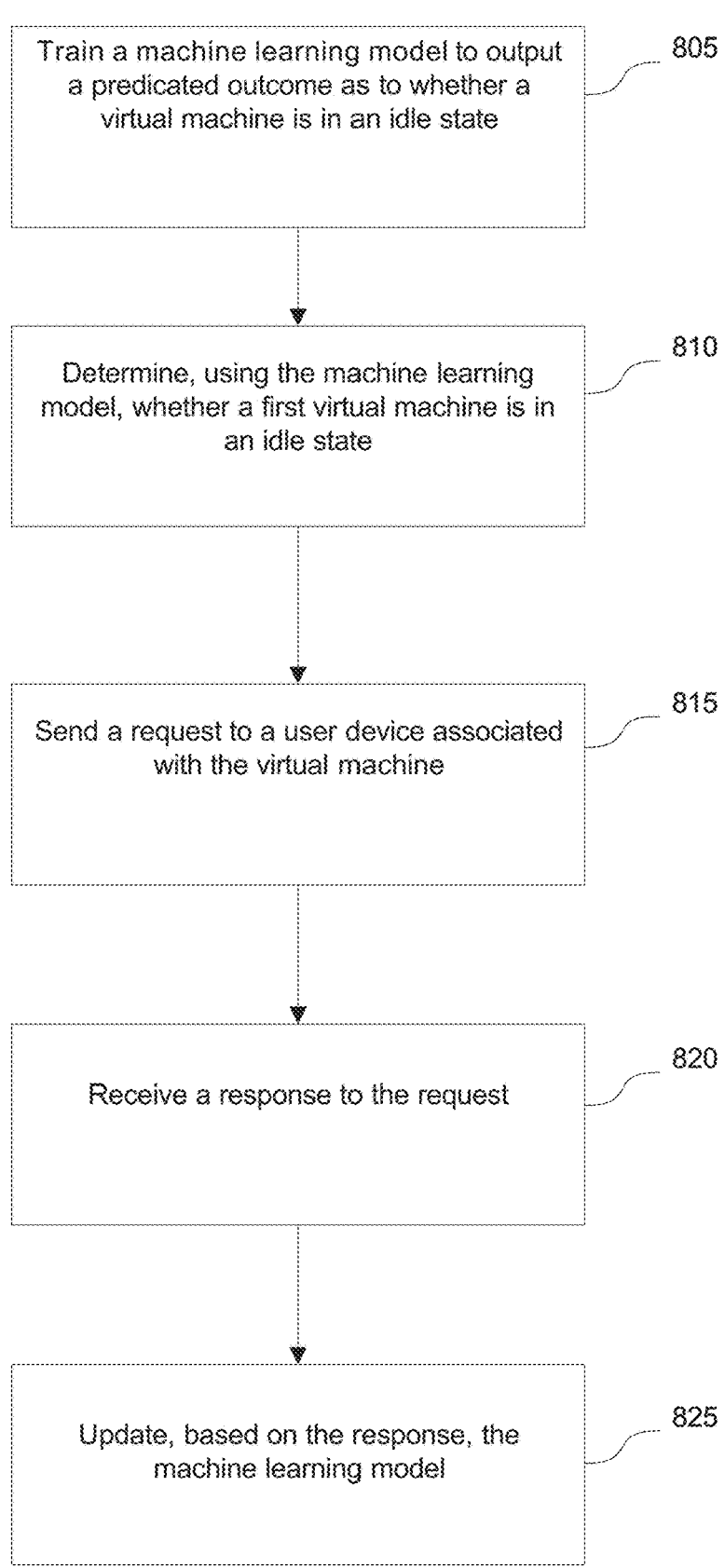

Train a machine learning model to output a predicated outcome as to whether a virtual machine is in an idle state ⟶ 805

Determine, using the machine learning model, whether a first virtual machine is in an idle state ⟶ 810

Send a request to a user device associated with the virtual machine ⟶ 815

Receive a response to the request ⟶ 820

Update, based on the response, the machine learning model ⟶ 825

FIG. 8

VIRTUAL MACHINE MANAGING SYSTEM USING SNAPSHOT

CROSS-REFERENCE TO RELATED APPLICATION

This application is a continuation of PCT Application No. PCT/CN2022/103324, filed on Jul. 1, 2022, and entitled "Virtual Machine Managing System Using Snapshot". The above-mentioned application is incorporated herein by reference in its entirety and for all purposes.

FIELD

Aspects described herein generally relate to computer virtualization, and hardware and software related thereto. More specifically, one or more aspects described herein provide systems and methods for managing virtual machines.

BACKGROUND

A virtualization computing platform may provide user devices access to virtual applications that are executed by virtual machines. A user device may connect with a virtual machine while accessing one or more virtual applications, and disconnect from the virtual machine while the user device is not actively interacting with the virtual applications. However, during the disconnection time period, the virtual machine may be continuously hosted by the virtualization platform, even if the virtual machine no longer implements any instructions from the user device. This results in a waste of computing resources.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

A user device may access one or more virtual applications (e.g., virtual desktop) executed by a virtual machine, hosted by a virtualization platform. When the user of the user device temporarily stops using the virtual applications, the user may disconnect the user device from the virtual machine. For example, when a user goes home, the user may shut down a user device that is located in the user's office. However, the user might not shut down the virtual applications because the user may want to resume the use of the virtual applications sometimes later. If the user shuts down the virtual applications, the user may need to save all the data. For example, if the user shuts down a virtual desktop, the user may need to save all the documents that are opened, and the user may need to reopen all the documents after the user restarts the virtual desktop. That may be inconvenient for the user.

However, if the user simply disconnects the user device from the virtual machine without shutting down the virtual applications, the virtual machine that executes the virtual applications may need to be continuously hosted by the virtual platform, in order to allow the user to resume the use of the virtual applications from where the user left. Therefore, the computing resources that are occupied by the virtual machine are not be reallocated to somewhere else, even if those computing resources are not in use. That causes a waste of computing resources.

To overcome limitations in the prior art described above, and to overcome other limitations that will be apparent upon reading and understanding the present specification, aspects described herein are directed towards managing virtual machines. A virtualization platform may monitor the computing resource usage of a virtual machine (e.g., after the virtual machine is disconnected from a previously connected user device), to determine whether the virtual machine is in an idle state. If the virtual machine is in an idle state (e.g., not implementing backend instructions from the user device), the virtual platform may take a snapshot of the virtual machine and release the computing resources occupied by the virtual machine. If the user requests to resume access to the virtual applications executed by the previously connected virtual machine, data in the snapshot may be loaded to another virtual machine, so that the user may resume access to the virtual applications from where the user left, without wasting computing resources while the previously connected virtual machine was not in use.

In at least one implementation, a virtualization computing platform may a plurality of virtual machines comprising a first virtual machine. The first virtual machine may be connected with a first user device associated with a user account. The virtualization computing platform may detect that the first user device is disconnected from the first virtual machine. The virtualization computing platform may determine, using a machine learning model and based on computing resource usage, of the first virtual machine, during a time period while the user device is disconnected, that the first virtual machine is in an idle state. The virtualization computing platform may obtain, based on the determination that the first virtual machine is in the idle state, a snapshot of the first virtual machine, and may cease hosting the first virtual machine. If the virtualization computing platform receives a request from a second user device to establish a second virtual machine, the virtualization computing platform may establish the second virtual machine and load, to memory of the second virtual machine, information associated with the snapshot. The second user device may be associated with the user account.

In some instances, the computing resource usage comprises at least one of: processor usage, memory usage, or network usage.

In some instances, a computing device associated with the virtualization computing platform may train, using training data comprising a plurality of input items each comprising information associated with computing resource usage of a virtual machine, the machine learning model to output a determination, corresponding to each input item, of whether the respective virtual machine is in an idle state or not. The computing device may receive a plurality of user responses each indicating whether a determined idle state of a corresponding virtual machine is correct or not. The computing device may update, based on the plurality of user responses, the machine learning model.

In some instances, the training of the machine learning model may be according to the following formula:

$$\mathrm{Loss}_N(\theta) = \frac{1}{N} \sum_i \left\{ -\left[ y_i * \log(p_{i_\theta}) + (1 - y_i) * \log(1 - p_{i_\theta}) \right] \times \frac{t_i}{\lambda + t_i} \right\}$$

In the formula, N may refer to a total number of samples; $y_i$ may refer to expected idle/busy state of the $i^{th}$ sample; $\theta$ may refer to parameters of the machine learning; poi may refer to prediction result made by the machine learning with parameters θ; $t_i$ may refer to disconnection time period of the $i^{th}$ sample; λ may refer to a non-trainable hyperparameter; and a training goal is to adjust the parameters θ to minimize the $Loss_N(θ)$ by leveraging Stochastic Gradient Descent optimizer $$\check{D} = \underset{\theta}{argmin} Loss_N.$$

In some instances, the virtualization computing platform may send, after the determination that the first virtual machine is in the idle state, before the ceasing hosting of the first virtual machine, and to a third user device associated with the user account, a notification that the hosting of the first virtual machine is to be ceased. The ceasing hosting the first virtual machine may be further based on a determination that a declination to ceasing hosting the first virtual machine is not received during a second time period.

In some instances, the plurality of virtual machines may further comprise a third virtual machine connected with a third user device. The virtualization computing platform may further determine that the third virtual machine is in an idle state; send, after the determination that the third virtual machine is in an idle state, a notification that the hosting of the third virtual machine is to be ceased; receive a response, to the notification, that declines to cease hosting the third virtual machine; and determine, based on the response, that the third virtual machine is in a busy state.

In some instances, the first virtual machine may be managed by a virtual delivery agent (VDA).

In some instances, the virtualization computing platform may determine that utilization of one or more computing resources associated with the virtual computing platform exceeds a threshold, and wherein the ceasing of hosting the first virtual machine is further based on the determination.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 8 depicts a flow diagram of an example method for training a machine learning model in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
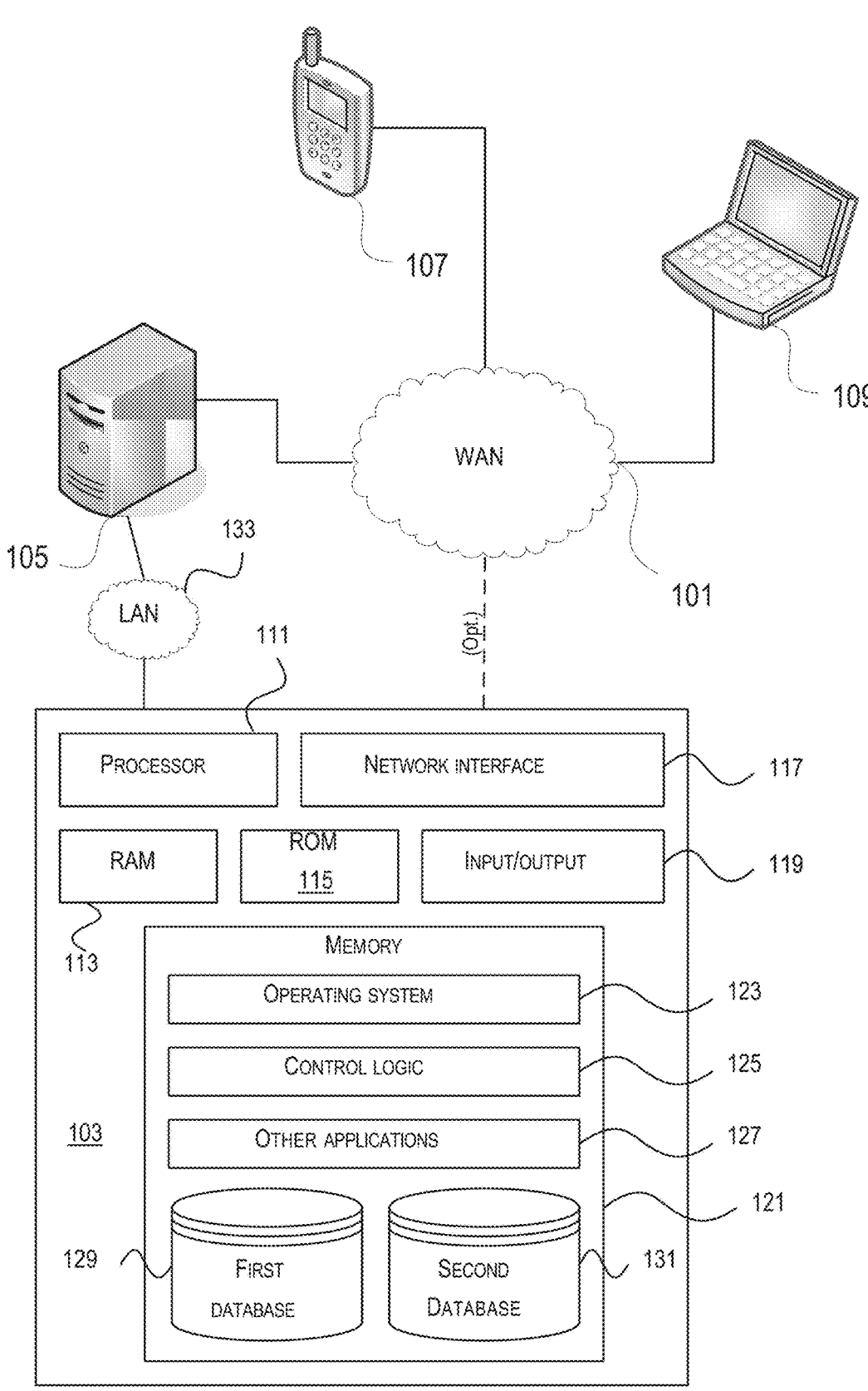
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
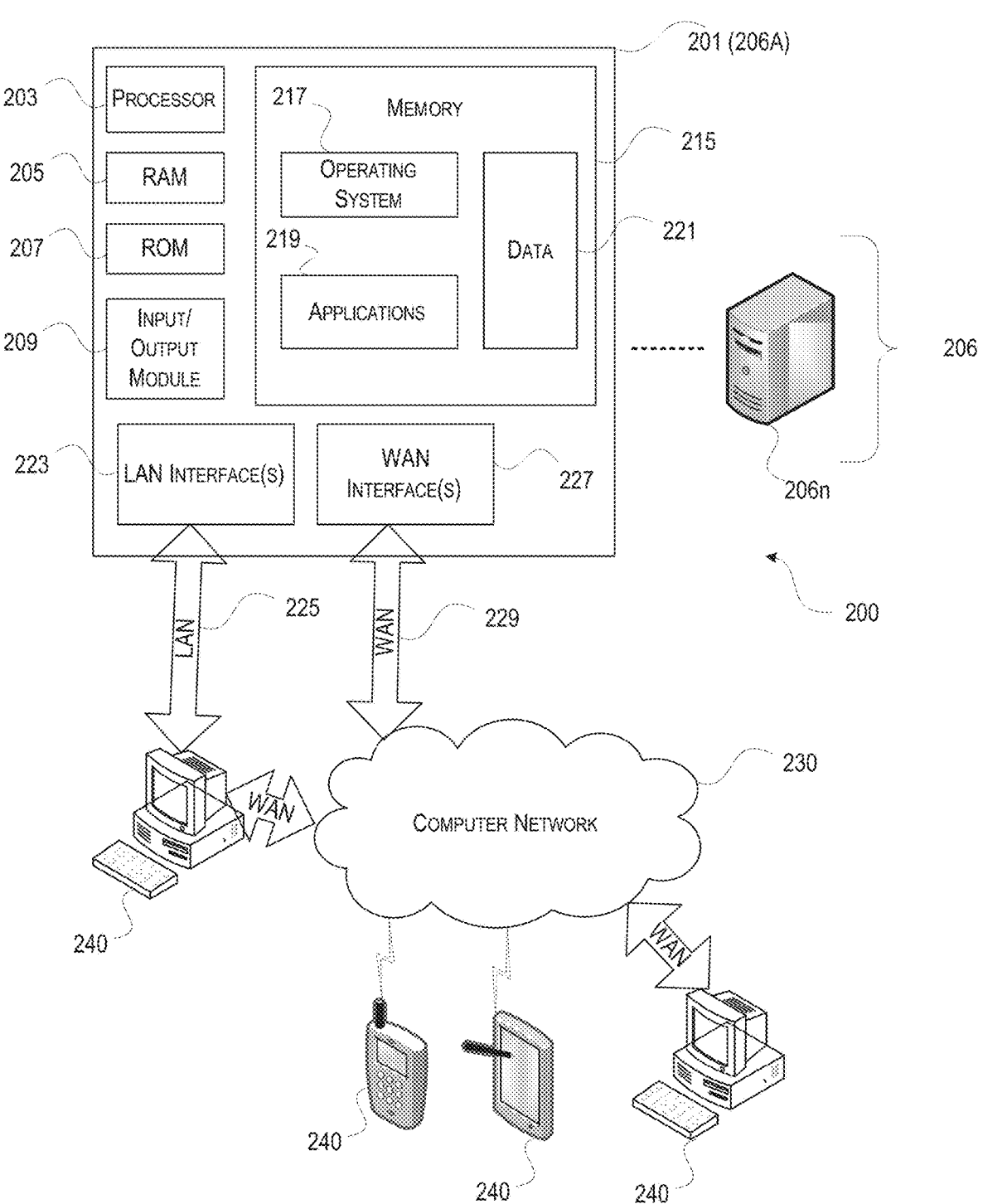
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
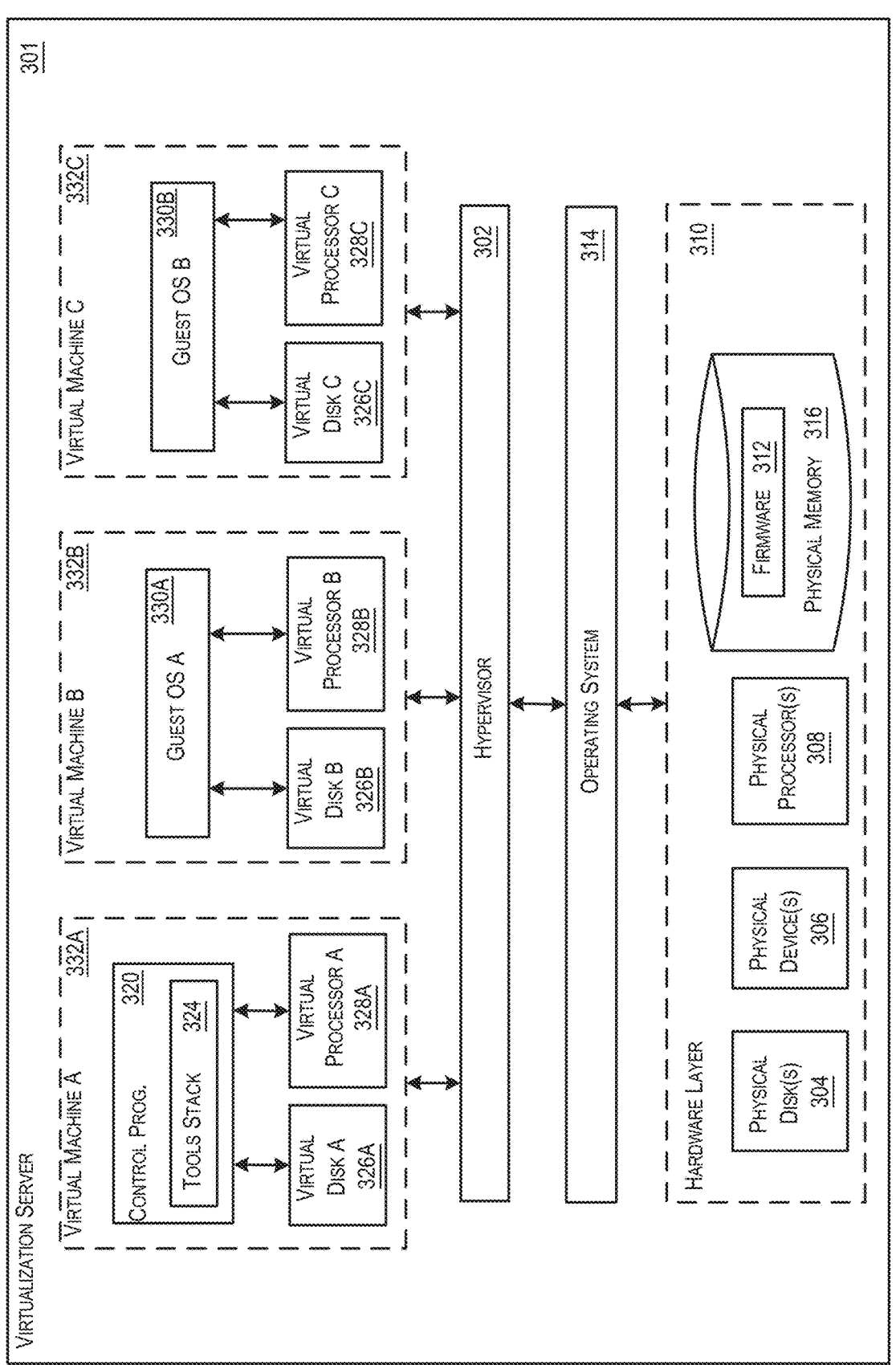
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; HyperV, Virtual-Server or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, FL.

Hypervisor 302 may create one or more virtual machines 332B-C(generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C(generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
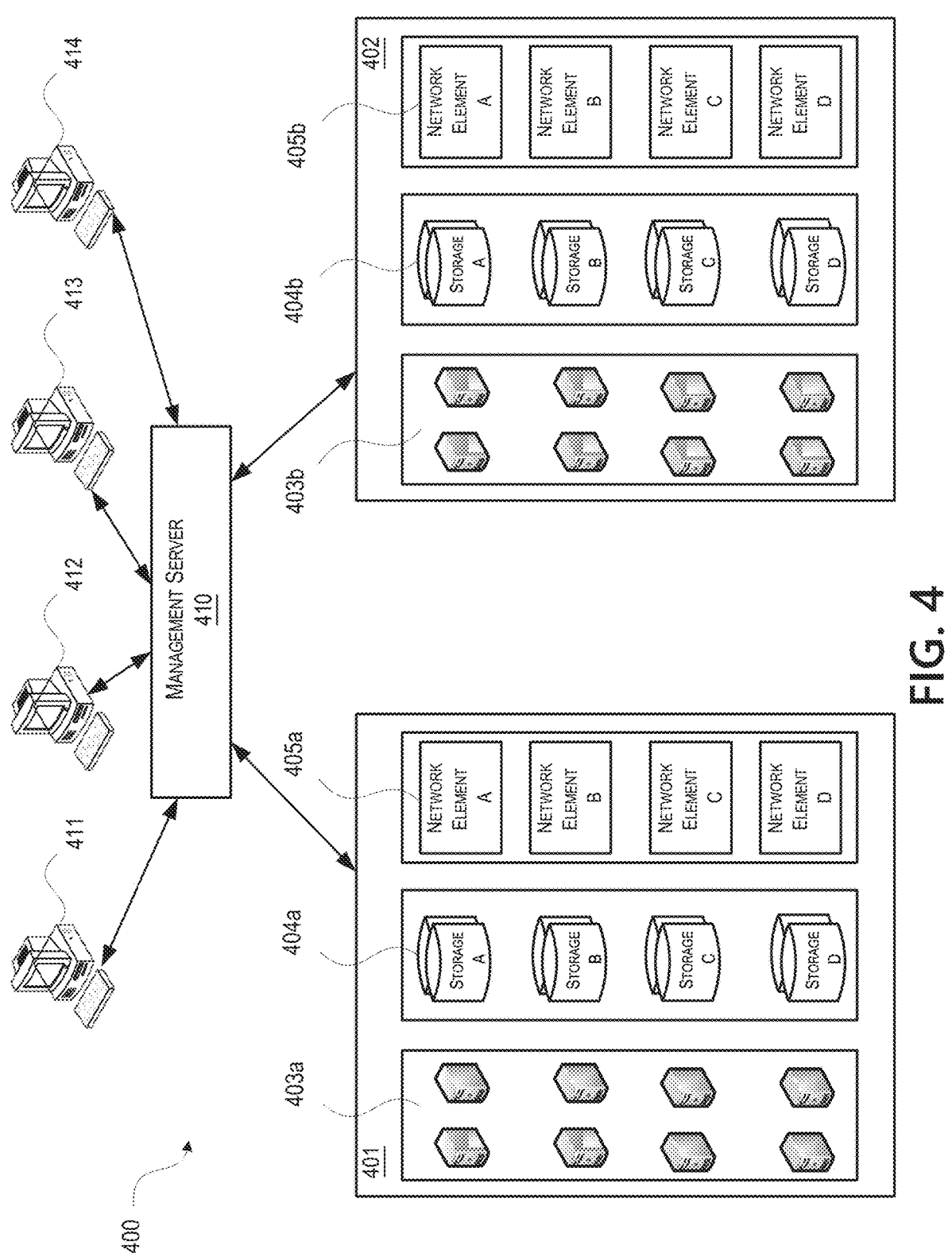
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403*a*-403*b* (generally referred herein as "host servers 403"), storage resources 404*a*-404*b* (generally referred herein as "storage resources 404"), and network elements 405*a*-405*b* (generally referred herein as "network resources 405")) of the cloud system.

Management server 410 may be implemented on one or more physical servers. The management server 410 may run, for example, Citrix Cloud by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

Resource Management System

Figure 5A:
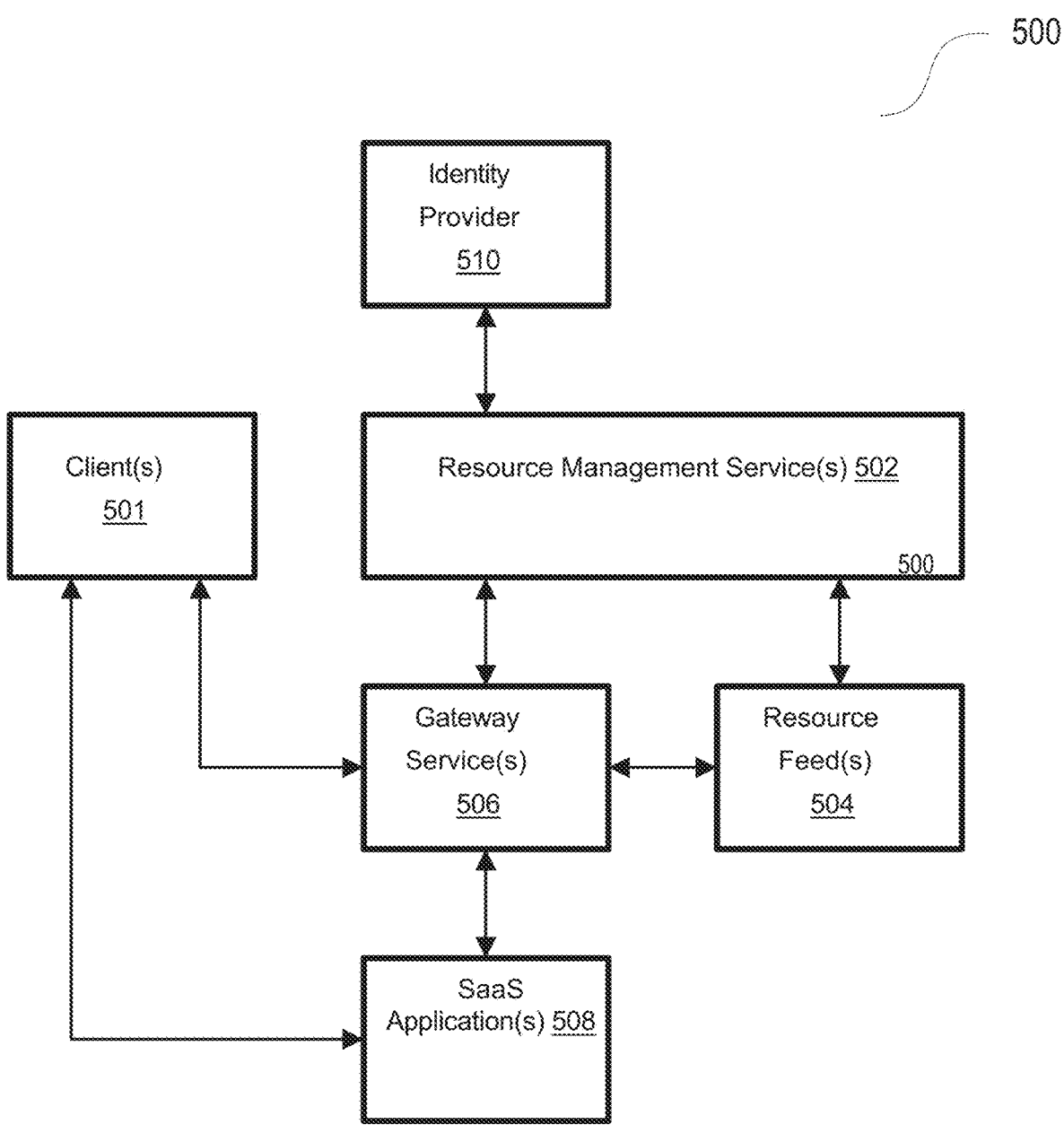
FIG. 5A is a block diagram of an example system in which resource management services may manage and streamline access by clients to resource feeds (via one or more gateway services) and/or software-as-a-service (SaaS) applications.

FIG. 5A is a block diagram of an example multi-resource access system 500 in which one or more resource management services 502 may manage and streamline access by one or more clients 501 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 501 and, following authentication, identify one or more resources the user is authorized to access. In response to the user selecting one of the identified resources, the resource management service(s) 502 may send appropriate access credentials to the requesting client 501, and the client 501 may then use those credentials to access the selected resource. For the resource feed(s) 504, the client 501 may use the supplied credentials to access the selected resource via a gateway service 506. For the SaaS application(s) 508, the client 501 may use the credentials to access the selected application directly.

The client(s) 501 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 501, one or more file repositories and/or file sharing systems, one or more secure browser services, one or more access control services for the SaaS applications 508, one or more management services for local applications on the client(s) 501, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

Figure 5B:
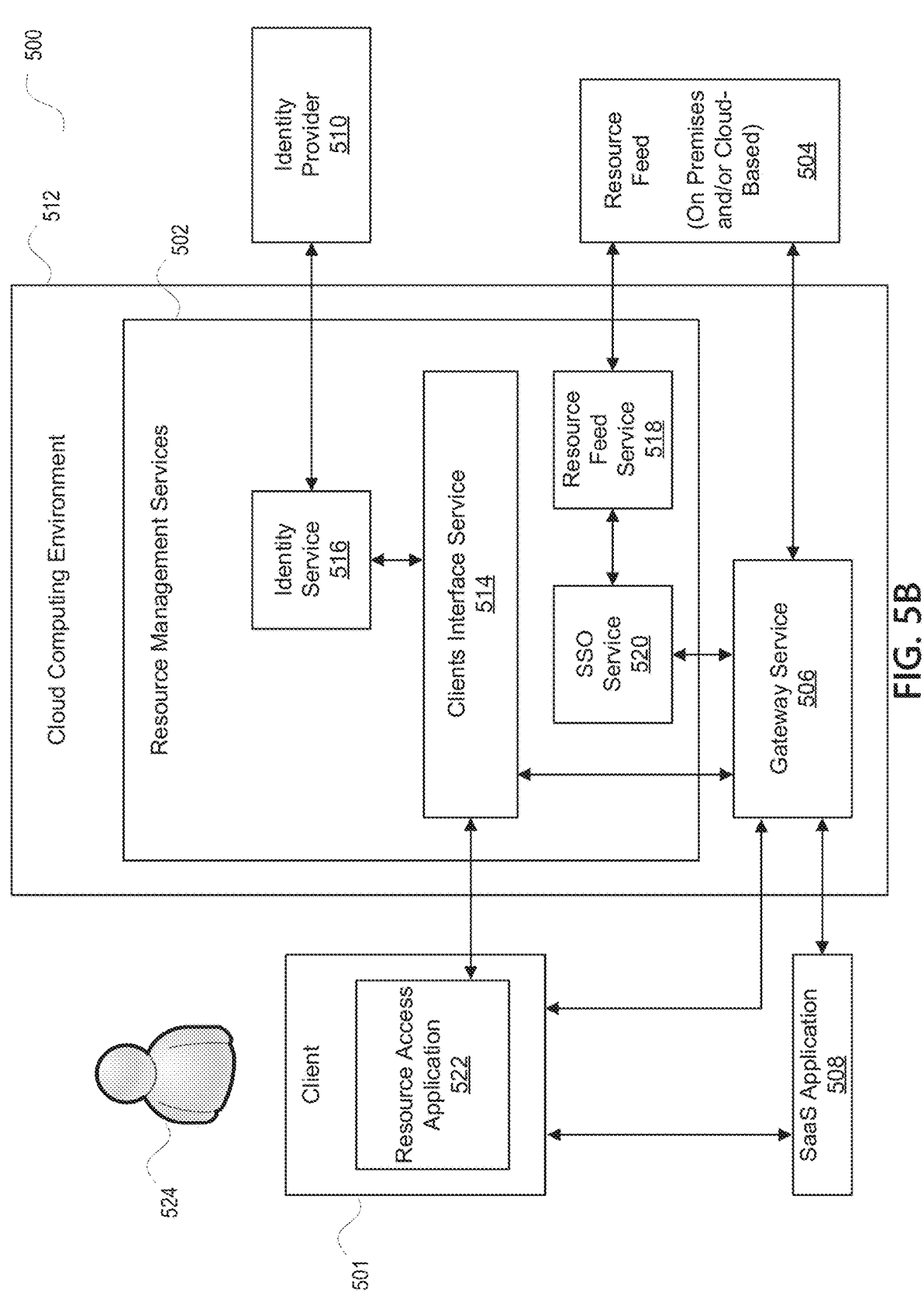
FIG. 5B is a block diagram showing an example implementation of the system shown in FIG. 5A in which various resource management services as well as a gateway service are located within a cloud computing environment.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 501) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 501 may use a resource access application 522 to communicate with the client interface service 514 as well as to present a user interface on the client 501 that a user 524 can operate to access the resource feed(s) 504 and/or the SaaS application(s) 508. The resource access application 522 may either be installed on the client 501, or may be executed by the client interface service 514 (or elsewhere in the multi-resource access system 500) and accessed using a web browser (not shown in FIG. 5B) on the client 501.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 501 to be redirected to the cloud-based identity service to complete an authentication process. The cloud-based identity service may then cause the client 501 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 501. The list of available resources may, for example, be presented on the user interface of the client 501 as a set of selectable icons or other elements corresponding to accessible resources. The resources so identified may, for example, include one or more virtual applications and/or desktops (e.g., Citrix Virtual Apps and Desktops™ VMware Horizon, Microsoft RDS, etc.), one or more file repositories and/or file sharing systems (e.g., Sharefile®, one or more secure browsers, one or more internet enabled devices or sensors, one or more local applications installed on the client 501, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 501 may proceed to access the selected resource.

When the user 524 selects a local application, the resource access application 522 may cause the selected local application to launch on the client 501. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 501 may then launch the identified browser and initiate a connection to the gateway service 506. The gateway service 506 may then request an assertion from the single sign-on service 520. Upon receiving the assertion, the gateway service 506 may cause the identified browser on the client 501 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 501 to access the selected SaaS application 508.

In some embodiments, the preferred browser identified by the gateway service 506 may be a specialized browser embedded in the resource access application 522 (when the resource access application 522 is installed on the client 501) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 501 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 501, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "decline," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 501 to notify a user 524 of something that requires the user's attention (e.g., approval of an expense report, new course available for registration, etc.).

Figure 5C:
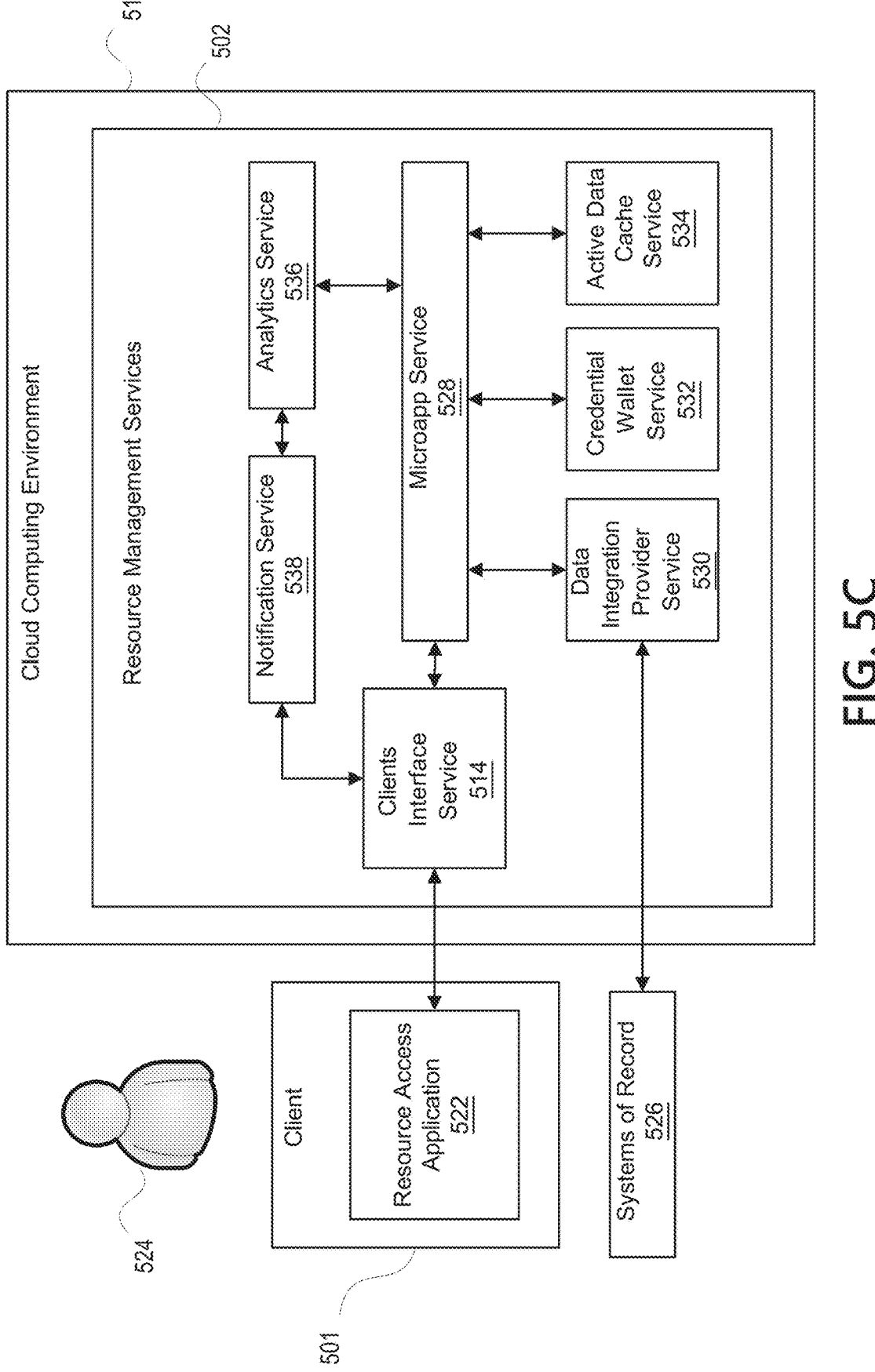
FIG. 5C is a block diagram similar to that shown in FIG. 5B but in which the available resources are represented by a single box labeled "systems of record," and further in which several different services are included among the resource management services.

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 501. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and 6ML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically cause active data to be pulled from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 501 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 501 as a push notification to the user 524.

In some embodiments, a process for processing a user-initiated action via a microapp may operate as follows. The client 501 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc.

This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

Figure 5D:
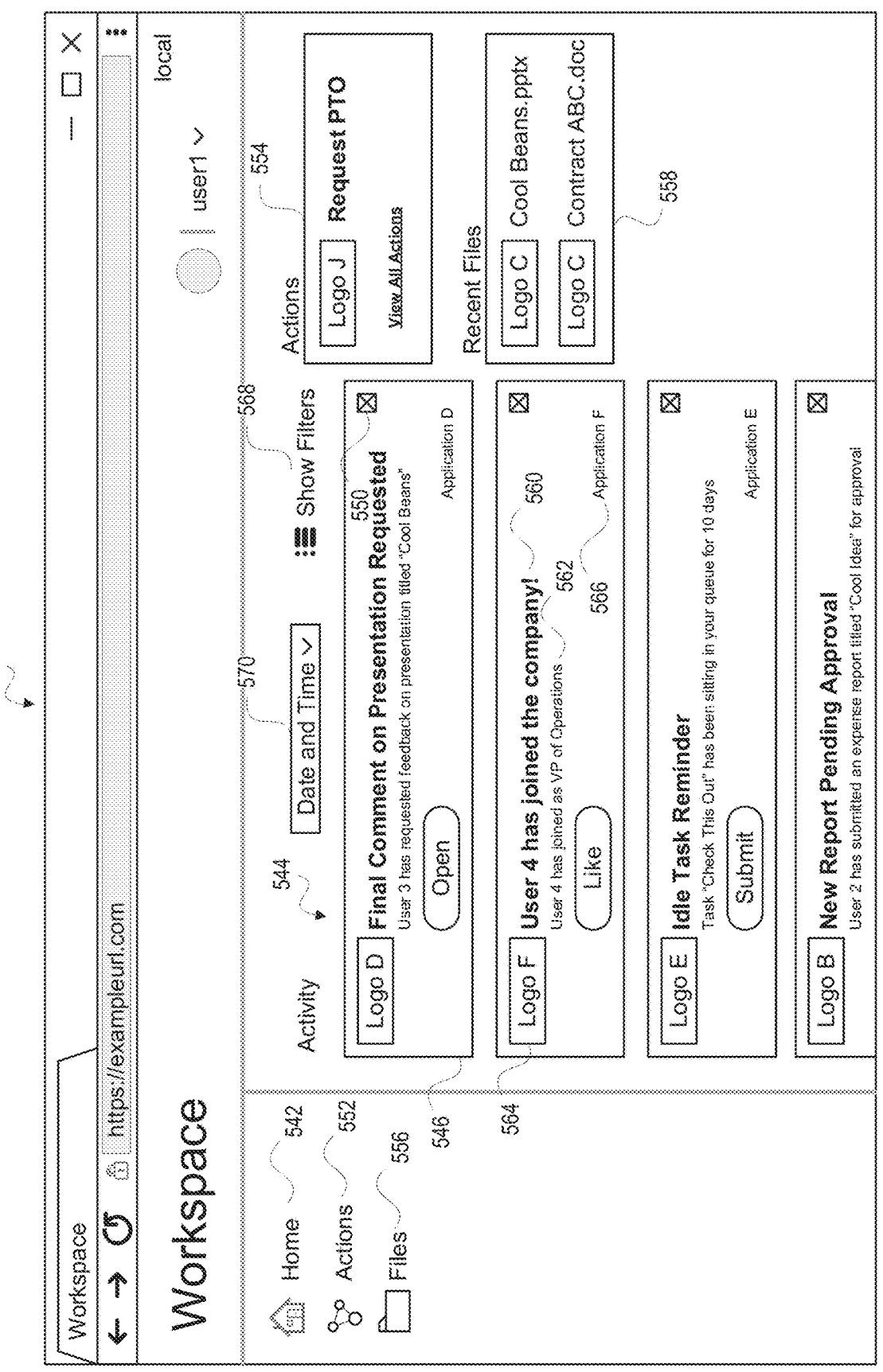
FIG. 5D shows how a display screen may appear when an intelligent activity feed feature of a multi-resource management system, such as that shown in FIG. 5C, is employed.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce®, Ariba®, Concur®, RightSignature®, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system or record to which the notification 546 corresponds, thus helping the user understand the proper context with which to decide how best to respond to the notification 546. In some implementations, one of more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D) and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user-interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user-interface element 552 or by selecting a desired action from a list 554 of recently and/or commonly used microapp actions. As shown, the user may also access files (e.g., via a Citrix ShareFile™ platform) by selecting a desired file, e.g., via a drop-down menu accessible using the "files" user interface element 556 or by selecting a desired file from a list 558 of recently and/or commonly used files.

Although not shown in FIG. 5D, it should be appreciated that, in some implementations, additional resources may also be accessed through the screen 540 by clicking on or otherwise selecting one or more other user interface elements that may be presented on the screen. For example, in some embodiments, one or more virtualized applications may be accessible (e.g., via a Citrix Virtual Apps and Desktops™ service) by clicking on or otherwise selecting an "apps" user-interface element (not shown) to reveal a list of accessible applications and/or one or more virtualized desktops may be accessed (e.g., via a Citrix Virtual Apps and Desktops® service) by clicking on or otherwise selecting a "desktops" user-interface element (not shown) to reveal a list of accessible desktops.

The activity feed shown in FIG. 5D provides significant benefits, as it allows a user to respond to application-specific events generated by disparate systems of record without needing to navigate to, launch, and interface with multiple different native applications.

Virtual Machine Managing System

Figure 6:
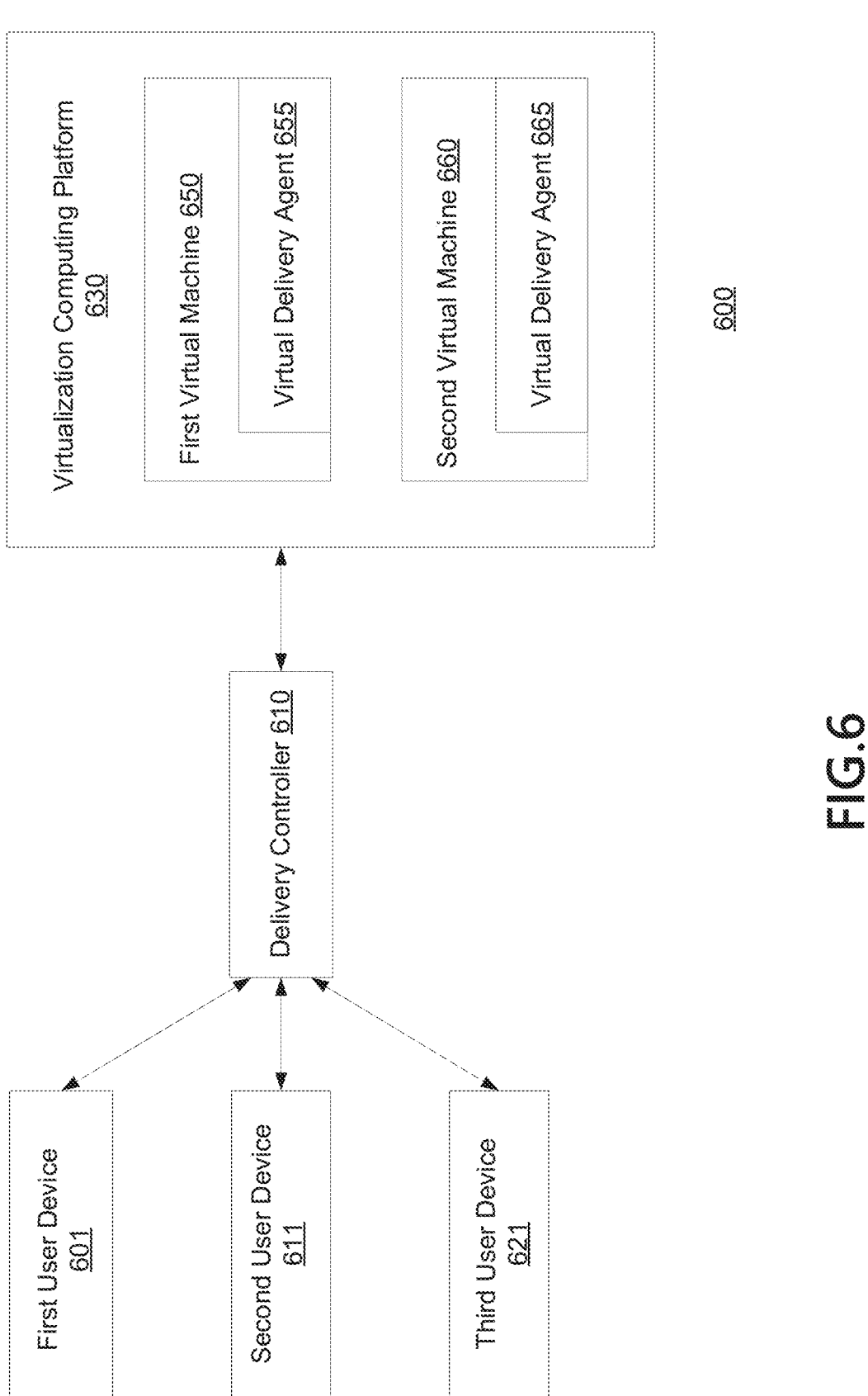
FIG. 6 depicts an illustrative computing environment in accordance with one or more illustrative aspects described herein.

FIG. 6 depicts an illustrative computing environment for managing virtual machines in accordance with one or more aspects described herein. The system 600 may comprise a plurality of user devices (e.g., first user device 601, second user device 611, and third user device 621), a delivery controller 610, and a virtualization computing platform 630 that hosts a plurality of virtual machines.

A user device may be associated with a user. For example, each of the plurality of user devices may be a laptop, a tablet, or a mobile device of a user. Each of the plurality of the user devices may be a client 501 as depicted in FIGS. 5A-5C, or other computing devices described in connection with FIGS. 1-4. Each of the plurality of user devices may communicate with the virtualization computing platform 630 in order to access one or more virtual applications (e.g., virtual desktops or other individual applications) that are executed on a virtual machine.

A plurality of virtual machines (e.g., first virtual machine 650, second virtual machine 660) may be hosted on the virtualization computing platform 630. Each of the plurality of the virtual machines may provide one or more virtual applications to one or more user devices. A virtual delivery agent ("VDA") may be executed on each of the plurality of virtual machines. For example, the first virtual delivery agent 655 may be executed on the first virtual machine 650. The second virtual delivery agent 665 may be executed on the second virtual machine 660. A VDA may be a hardware or software component configured to communicate with the user device (e.g., via the delivery controller 610) to facilitate the user device to remotely access applications or desktops that are executed on the virtual machine on which the VDA installs. It is appreciated that VDA is merely an example, and other agents (e.g., other virtual desktop infrastructure ("VDI") components) may be installed on the virtual machine to implement similar functions.

The virtualization computing platform 630 may comprise be a virtualization server 301 as shown in FIG. 3, a cloud management server 410 as shown in FIG. 4, or any other computing devices. The virtualization computing platform 630 may create a new virtual machine and/or host the virtual machine by allocating computing resources (e.g., processing resources on a host server 403, storage resources 404, and/or network resources 405 as shown in FIG. 4) to the virtual machine. The virtualization machine platform 630 may cease hosting a virtual machine by releasing the computing resources allocated to that virtual machine. The released computing resources may be allocated to other virtual machines or be released into a resource pool for future use.

The communication between a virtual machine and a user device may be implemented via the delivery controller 610 (e.g., a desktop delivery controller ("DDC")). The delivery controller 610 may include one or more computing devices and/or other computer components (e.g., processors, memories, communication interfaces, servers, server blades, or the like). For example, the delivery controller 610 may be and/or include any of data server 103 or web server 105 (as depicted in FIG. 1), server 206 (as depicted in FIG. 2), virtualization server 301 (as depicted in FIG. 3), management server 410 (as depicted in FIG. 4), resources management service(s) 502, cloud computing environment 512 (as depicted in FIGS. 5A-5C), or any other computing devices. The communication between a user device (e.g., user device 601) and the delivery controller 610 may use a protocol (e.g., an independent computing architecture or a remote desktop protocol). The delivery controller 610 may receive a request from a user device to access a virtual application. The delivery controller 610 may establish a connection between the user device and the virtual machine that executes the virtual application. The delivery controller 610 may also implement some or all functions of managing virtual machines as discussed below in connection with FIGS. 7-9.

Figure 7:
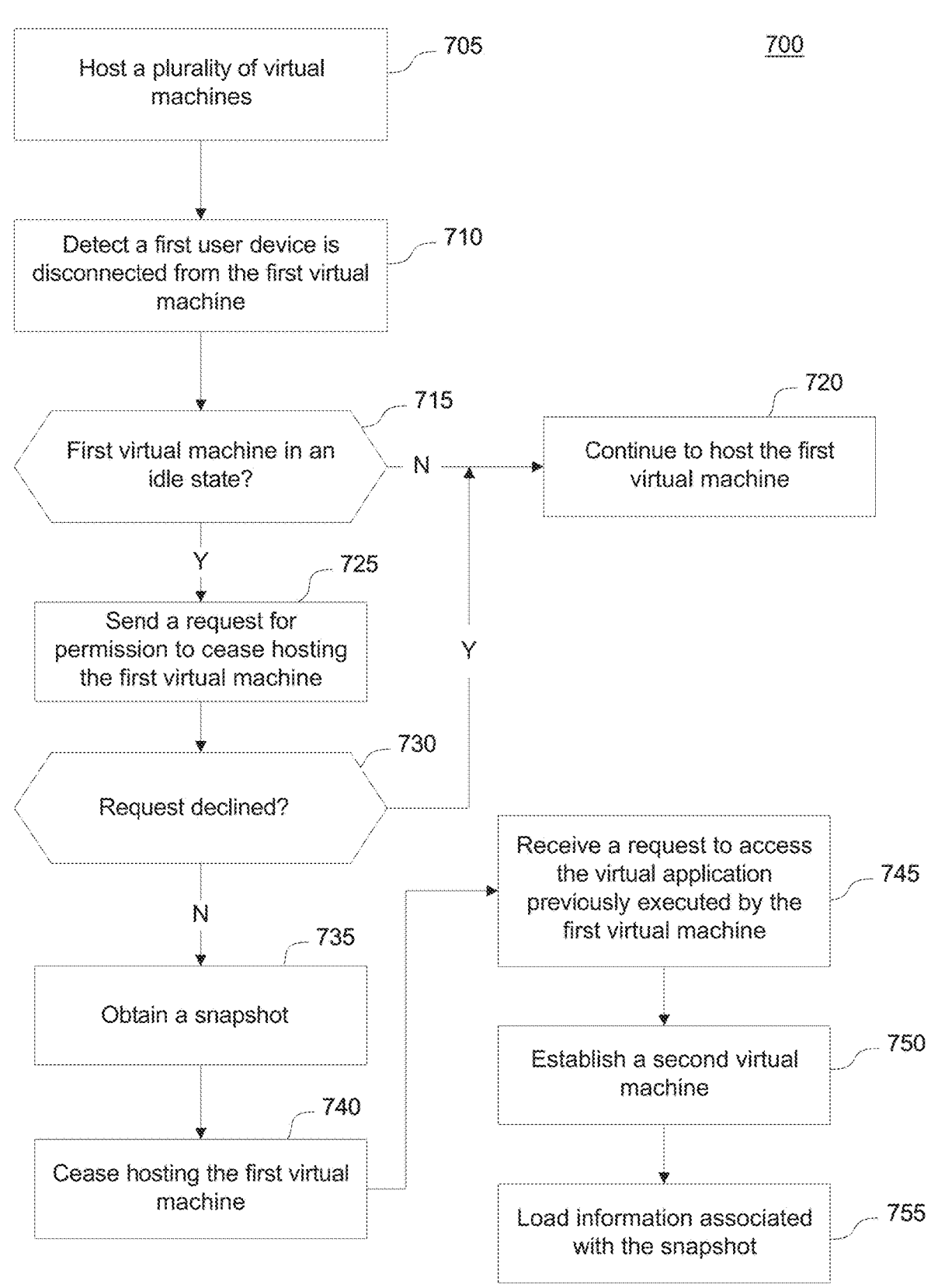
FIG. 7 depicts a flow diagram of an example method for managing virtual machines in accordance with one or more illustrative aspects described herein.

FIG. 7 depicts an example flow chart for managing virtual machines. The steps of method 700 may be performed by a system (e.g., the delivery controller 610 and the virtualization computing platform 630 as shown in FIG. 6). Alternatively or additionally, some or all of the steps of method 700 may be performed by one or more other computing devices. The steps of method 700 may be modified, omitted, and/or performed in other orders, and/or other steps added.

At step 705, the system (e.g., the virtualization computing platform 630) may host a plurality of virtual machines (e.g., the first virtual machine 650 and the second virtual machine 660 as shown in FIG. 6). The plurality of virtual machines may comprise a first virtual machine 605 that is connected with a first user device 601. The first user device 601 may be associated with a first user account of a first user. The first user device 601 may log in to the first user account using username and credentials. While the first user device 601 is connected with the first virtual machine 605, the first user device 601 may access virtual applications executed on the first virtual machine 605. For example, a session (e.g., virtual session) may be established between a first virtual machine 605 and the user device 601. A dedicated connection (e.g., a virtual connection, a SaaS connection) may be established between the first user device 601 and the first virtual machine 605. The first virtual machine 605 may receive input (e.g., data and/or instructions) from the first user device 601, execute the instructions, and send output data back to the first user device 601.

At step 710, the system (e.g., the delivery controller 610) may detect that the first user device 601 is disconnected from the first virtual machine 605. For example, the first user device 601 may log out of the user account and/or power off. The virtual session and/or the dedicated connection may no longer be maintained. However, the virtual applications on the first virtual machine 605 might not be shut down, since the user wants to resume using the virtual applications at a later time. After the disconnection between the first user device 601 and the first virtual machine 605, on some occasions, the first virtual machine 605 may no longer implement any instructions from the first user device 601 and therefore is in an idle state. On other occasions, the first virtual machine 605 may still execute instructions that were previously received from the first user device 601. For example, the first user device 601 may have instructed an application on the first virtual machine 605 to perform a complicated calculation task that takes a long period of time (e.g., several hours). While the calculation task is performed, the user may turn the first user device 601 off. In another example, the first user device 601 may have instructed an application on the first virtual machine 605 to monitor a sensor. The instruction to monitor the sensor may be effective even after the first user device 601 is logged off or powered off. Therefore, the system may still need to host the first virtual machine 605 in order to avoid interruption of the tasks that may be implemented on the first virtual machine 605.

At step 715, the system may determine whether the first virtual machine 605 is in an idle state. The first virtual machine 605 may be in an idle state if the first virtual machine 605 is no longer implementing any instructions from the first user device 601. If the first virtual machine 605 is still implementing instructions from the first user device 601, the first virtual machine 605 may be in a busy state. If the system determines that the first virtual machine 605 is not in an idle state, the method may proceed to step 720, in which the system may keep hosting the first virtual machine 605. If the system determines that the first virtual machine 605 is in an idle state, the method may proceed to step 725, in which the system may seek to release computing resources occupied by the first virtual machine 605, as discussed below.

A determination as to whether the first virtual machine 605 is in an idle state may be implemented by using a machine learning model. The determination may be based on computing resource usage of the first virtual machine 605 during a time period while the first user device 601 is disconnected. The computing resource usage may comprise at least one of processor usage, memory usage, or network usage. As discussed above, disconnecting from the first user device 601 does not necessarily indicate the first virtual machine 605 is in an idle state. However, it is appreciated that while the first virtual machine 605 is in an idle state, some computing resources may still be used by the first virtual machine 605 as the first virtual machine 605 may execute some instructions from the system (e.g., the delivery controller 610) or otherwise communicate with the system. The machine learning model may be trained as described in connection with FIG. 8 below.

The determination as to whether the first virtual machine 605 is in an idle state may be made at a variety of possible time points. For example, the determination may be made at a predetermined time point (e.g., 30 minutes) after the first user device is disconnected. In another example, the system may check whether any virtual machines are in an idle state periodically. The system may monitor a plurality of virtual machines that are hosted by the system (e.g., the virtualization computing platform 630) periodically (e.g., twice a day) to determine if any of the plurality of virtual machines is in an idle state. In yet another example, the determination may be made if the system detects that the utilization of one or more computing resources associated with the virtualization computing platform 630 exceeds a threshold. For example, if the system determines that more than a certain percentage (e.g., 80%) of computing resources managed by the virtualization computing platform 630 has been occupied, the system may determine whether any of the plurality of virtual machines that the system hosts are in an idle state, in order to release some computing resources.

At step 720, the system may continue to host the first virtual machine 605 based on the first virtual machine 605 may be in use by the user, even though the first user device 601 has been disconnected from the first virtual machine 605. As discussed above, the first user device 601 may have been disconnected while the first virtual machine 605 is performing certain functions that do not require the user's real-time interaction, such as monitoring the status of a sensor or conducting a complicated calculation task.

At step 725, the system may send, to a second user device 611 associated with the first user, a request to obtain permission to cease hosting the first virtual machine 605. The second user device 611 may be associated with the same user that the first user device 601 associated with. The second user device 611 may be the same device as the first user device 601, or the second user device 611 may be a different device from the first user device 601. For example, the first user device 601 may be a laptop in the first user's office, while the second user device 611 may be a mobile phone of the first user and may be linked to the same user account.

At step 730, the system may determine whether the request is declined. A default rule may apply. For example, if no response is received during a predetermined period of time (e.g., 5 minutes), the system may treat the request as being approved and may determine that the user provides permission to cease hosting the first virtual machine 605. If the system determines that the request is declined, the method may proceed to step 720, in which the system may continue hosting the first virtual machine 605. If the system determines that the request is approved, the method may proceed to step 735.

At step 735, the system may obtain, based on the determination that the first virtual machine 605 is in the idle state, a snapshot of the first virtual machine 605. The snapshot may comprise all or a portion of information (data and/or instructions) stored in the memory of the first virtual machine 605. For example, the snapshot may comprise information stored in random access memory ("RAM")

allocated to the first virtual machine 605. For example, the first virtual machine 605 may execute a virtual desktop and the snapshot may comprise data associated with each application on the virtual desktop. For example, if a WORD® document was opened the user wrote an article using the WORD® document, the snapshot may comprise the article the user wrote. Additionally or alternatively, the snapshot may also comprise information associated with the VDA 655 that is installed on the first virtual machine 605. The snapshot may be stored in a database that is connected to the system. As discussed below, the snapshot may be loaded to another virtual machine at a future time so that the system may resume the virtual applications executed by the first virtual machine 605 from where the first user left. Consistent with the example of the opened WORD® document discussed above, the system may load the snapshot onto another virtual machine at a future time so that the user may access the article the user was writing even if the user did not save the document manually when the first user device 601 was disconnected.

At step 740, the system may cease hosting the first virtual machine 605. The system may release the computing resources that are allocated to the first virtual machine 605. The released computing resources may be reallocated to other virtual machines that are currently hosted by the system, or released to a resource pool so that new virtual machines created at a future time may use the resource.

At step 745, the system may receive a request to access the virtual applications that the first user device 601 previously accessed. The request may be received from a third user device 621 that is associated with the user account of the first user, which was previously connected with the first virtual machine 605. For example, the third user device 621 may log in to the virtual applications using the same user account and password that were used by the first user device 601. The third user device 621 may be the same device as the first user device 601, or the third user device 621 may be a different device from the first user device 601. For example, the first user device 601 may be a laptop that is in the office of the first user, while the third user device 621 may be a laptop that is in the home of the first user. The first user may log off the user account from the first user device 601, go home, and log in to the same user account from the third user device 621 after the first user arrives home. The first user may request to access the same virtual application or desktop and resume working from where the first user left.

At step 750, the system may establish, based on a request received from step 745, a second virtual machine 660. For example, the system may create a second virtual machine 660 by allocating, to the second virtual machine 660, computing resources that are managed by the system. A second VDA 665 may be installed on the second virtual machine 660.

At step 755, the system may load, to the memory of the second virtual machine 660, information associated with the snapshot that was obtained from the first virtual machine 650, as discussed above. The second virtual machine 660 may use information included in the snapshot to resume applications that were executed on the first virtual machine 650 when the first virtual machine 650 was stopped to be hosted, so that the first user may access the virtual application executed on the second virtual machine 660 as if the first virtual machine 650 were continuingly hosted by the system while the first user disconnects. In this way, consumption of computing resources is reduced during the time period while the first user does not use the virtual machines, but the user experience is not affected since the user may still be able to resume the virtual application from where the user left.

FIG. 8 depicts an example flow chart for training a machine learning model (e.g., a neural network model). The machine learning model (e.g., a neural network model) may be used in FIG. 7 to determine whether a particular virtual machine is in an idle state. The virtual machine may be a virtual machine depicted in FIG. 6 (e.g., first virtual machine 650 or second virtual machine 660). The steps of method 800 may be performed by a system (e.g., the delivery controller 610 and/or the virtualization computing platform 630 as shown in FIG. 6). Alternatively or additionally, some or all of the steps of method 800 may be performed by one or more other computing devices. The steps of method 800 may be modified, omitted, and/or performed in other orders, and/or other steps added.

At step 805, the system may train a machine learning model to output a determination as to whether a virtual machine is in an idle state. The output may be based on input information indicating computing resource usage, of the corresponding virtual machine, during a period of time. The machine learning model may be trained using training a plurality of training data sets comprising information that indicates computing resource usage of a virtual machine and/or a predicted outcome in terms of whether the virtual machine is in an idle state.

Figure 9:
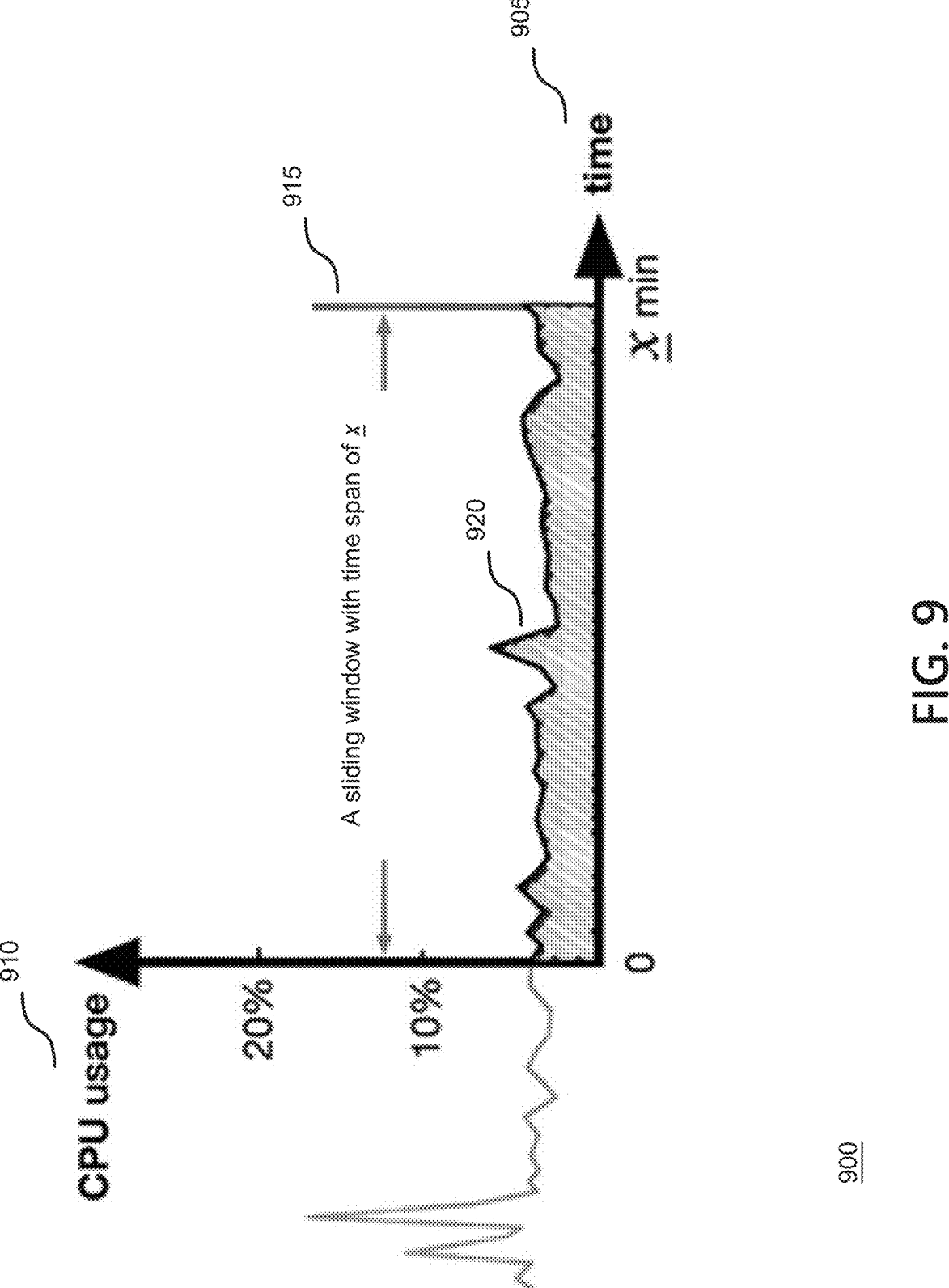
FIG. 9 depicts an example coordinate graph for CPU usage over time in accordance with one or more illustrative aspects described herein.

FIG. 9 shows an example training data set that comprises information indicating CPU usage of a virtual machine. In the X-Y coordinate graph 900 shown in FIG. 9, the X coordinate axis 905 may represent the time, while the Y coordinate axis 910 may represent the percentage of CPU usage of a virtual machine. A point (x, y) within the coordinate graph 900 may represent the CPU usage of a virtual machine at a particular time. Function 920 may represent CPU usage of a given virtual machine over a time span of x (as shown in the sliding window 915). Function 920 may be used as a training data set to be input into the machine learning model. A predicated outcome as to whether the training data set 920 indicates the corresponding virtual machine is in an idle state may be labeled (e.g., based on a default rule) or determined by the machine learning model. For example, a default rule may indicate that if the CPU usage of a virtual machine is below 10% over 30 minutes after the virtual machine is disconnected from a user device that previously connected with the virtual machine, the virtual machine is in an idle state (e.g., the less than 10% of CPU usage may be due to communication between the delivery controller 610 and the virtual machine). The default rule may indicate that if the CPU usage has not been below 10% over 30 minutes, there is a high likelihood that the virtual machine is still in use.

A training data set may be obtained from real computing resource data that is obtained from a system (e.g., virtualization computing platform 630) in practice. If the training data set is obtained in practice, the predicted outcome may be updated based on the user's feedback as discussed below. As discussed below, if the predicted outcome is updated (e.g., based on user's feedback), the updated training data set may be input into the machine learning model again and the corresponding training data set before the update may be overwritten. In this way, the accuracy of the prediction may be improved over time.

The machine learning model (e.g., neural network model) may be trained according to the following formula:

$$\text{Loss}_N(\theta) = \frac{1}{N} \sum_i \left\{ -\left[ y_i * \log(p_{i_\theta}) + (1-y_i) * \log(1-p_{i_\theta}) \right] \times \frac{t_i}{\lambda + t_i} \right\}$$

In the formula, integer N may refer to a total number of samples (e.g., training data sets). For example, one of the samples may be the training data set 920 as shown in FIG. 9. $Y_i$ may refer to $_{the}$ expected idle/busy state of the $i^{th}$ sample. $\theta$ may refer to parameters of the neural network. $P_{i\_\theta}$ may refer to a prediction outcome made by the neural network with parameters $\theta$. $T_i$ may refer to the disconnection time period of the $i^{th}$ sample. $\lambda$ may refer to a non-trainable hyperparameter. The training goal may be to adjust the parameters $\theta$ to minimize the $\text{Loss}_N(\theta)$ by leveraging the Stochastic Gradient Descent optimizer $$\check{D} = \operatorname*{argmin}_{\theta} \text{Loss}_N.$$

At step 810, the system may determine, using the machine learning model, whether a virtual machine is in an idle state. As discussed above in connection with FIG. 7, the system may input information regarding computing resources usage of the first virtual machine 650 into the machine learning model to determine whether the first virtual machine 650 is in an idle state after the first user device 601 was disconnected for a certain amount of time.

At step 815, the system may send a request to a user device that is associated with the user account that disconnects from the virtual machine. As may be described in connection with FIG. 7, the request may seek permission from the user to cease hosting the virtual machine.

At step 820, the system may receive a response to the request. The response may indicate whether the user provides permission to cease hosting the virtual machine. If the response indicates a result that is different from the predicted outcome made by the machine learning model (e.g., the machine learning model predicates that the virtual machine is in an idle state but the user declined to allow the system to cease hosting the virtual machine), the method may proceed to step 825.

At step 825, the system may update, based on the response, the machine learning model. For example, the updated training data set may be input into the machine learning model, with an updated label of the outcome that is indicated by the response. The machine learning model may improve the prediction based on the update.

The following paragraphs (M1) through (M8) describe examples of methods that may be implemented in accordance with the present disclosure.

(M1) A method comprising hosting, by a virtualization computing platform, a plurality of virtual machines comprising a first virtual machine, wherein the first virtual machine is connected with a first user device associated with a user account; detecting that the first user device is disconnected from the first virtual machine; determining, using a machine learning model and based on computing resource usage, of the first virtual machine, during a time period while the user device is disconnected, that the first virtual machine is in an idle state; obtaining, based on the determination that the first virtual machine is in the idle state, a snapshot of the first virtual machine; ceasing hosting the first virtual machine; establishing, based on a request from a second user device, a second virtual machine, wherein the second user device is associated with the user account; and loading, to memory of the second virtual machine, information associated with the snapshot.

(M2) A method may be performed as described in paragraph (M1) wherein the computing resource usage comprises at least one of: processor usage; memory usage; or network usage.

(M3) A method may be performed as described in paragraph (M1) or (M2) further comprising training, using training data comprising a plurality of input items each comprising information associated with computing resource usage of a virtual machine, the machine learning model to output a determination, corresponding to each input item, of whether the respective virtual machine is in an idle state or not; receiving a plurality of user responses each indicating whether a determined idle state of a corresponding virtual machine is correct or not; and updating, based on the plurality of user responses, the machine learning model.

(M4) A method may be performed as described in paragraph (M3) wherein the training of the machine learning model is according to the following formula:

$$\text{Loss}_N(\theta) = \frac{1}{N}\sum_i \left\{ -\left[y_i * \log\left(p_{i_\theta}\right) + (1-y_i) * \log\left(1 - p_{i_\theta}\right)\right] \times \frac{t_i}{\lambda + t_i} \right\}$$

wherein
N=a total number of samples;
$y_i$=expected idle/busy state of the sample;
$\theta$=parameters of the machine learning;
$p_{i\_\theta}$=prediction result made by the machine learning with parameters $\theta$;
$t_i$=disconnection time period of the it sample;
$\lambda$=a non-trainable hyperparameter; and
wherein a training goal is to adjust the parameters $\theta$ to minimize the $\text{Loss}_N(\theta)$ by leveraging Stochastic Gradient Descent optimizer $$\check{D} = \underset{\theta}{\text{argmin}}\text{Loss}_N.$$

(M5) A method may be performed as described in any of paragraphs (M1) through (M4) further comprising sending, after the determination that the first virtual machine is in the idle state, before the ceasing hosting of the first virtual machine, and to a third user device associated with the user account, a notification that the hosting of the first virtual machine is to be ceased; and wherein the ceasing hosting the first virtual machine is further based on a determination that a declination to ceasing hosting the first virtual machine is not received during a second time period.

(M6) A method may be performed as described in any of paragraphs (M1) through (M5) wherein the plurality of virtual machines further comprises a third virtual machine connected with a third user device, and wherein the method further comprises: determining that the third virtual machine is in an idle state; sending, after the determination that the third virtual machine is in an idle state, a notification that the hosting of the third virtual machine is to be ceased; receiving a response, to the notification, that declines to cease hosting the third virtual machine; and determining, based on the response, that the third virtual machine is in a busy state.

(M7) A method may be performed as described in any of paragraphs (M1) through (M6) wherein the first virtual machine is managed by a virtual delivery agent (VDA).

(M8) A method may be performed as described in any of paragraphs (M1) through (M7) further comprising determining that utilization of one or more computing resources associated with the virtual computing platform exceeds a threshold, and wherein the ceasing of hosting the first virtual machine is further based on the determination.

The following paragraphs (A1) through (A8) describe examples of apparatuses that may be implemented in accordance with the present disclosure.

(A1) An apparatus comprising one or more processors; and memory storing instructions that, when executed by the one or more processors, cause the apparatus to: host a plurality of virtual machines comprising a first virtual machine, wherein the first virtual machine is connected with a first user device associated with a user account; detect that the first user device is disconnected from the first virtual machine; determine, using a machine learning model and based on computing resource usage, of the first virtual machine, during a time period while the user device is disconnected, that the first virtual machine is in an idle state; obtain, based on the determination that the first virtual machine is in the idle state, a snapshot of the first virtual machine; cease hosting the first virtual machine; establish, based on a request from a second user device, a second virtual machine, wherein the second user device is associated with the user account; and load, to memory of the second virtual machine, information associated with the snapshot.

(A2) An apparatus may be performed as described in paragraph (M1), wherein the computing resource usage comprises at least one of: processor usage; memory usage; or network usage.

(A3) An apparatus may be performed as described in paragraph (M1) or (M2) wherein the instructions, when executed by the one or more processors, cause the apparatus further to: train, using training data comprising a plurality of input items each comprising information associated with computing resource usage of a virtual machine, the machine learning model to output a determination, corresponding to each input item, of whether the respective virtual machine is in an idle state or not; receive a plurality of user responses each indicating whether a determined idle state of a corresponding virtual machine is correct or not; and update, based on the plurality of user responses, the machine learning model.

(A4) An apparatus may be performed as described in paragraph (A3) wherein the instructions, when executed by the one or more processors, cause the apparatus to train the machine learning model is according to the following formula:

$$\text{Loss}_N(\theta) = \frac{1}{N}\sum_i \left\{ -\left[y_i * \log\left(p_{i_\theta}\right) + (1-y_i) * \log\left(1 - p_{i_\theta}\right)\right] \times \frac{t_i}{\lambda + t_i} \right\}$$

wherein
N=a total number of samples;
$y_i$=expected idle/busy state of the $i^{th}$ sample;
$\theta$=parameters of the machine learning;
$p_{i\_\theta}$=prediction result made by the machine learning with parameters $\theta$;
$t_i$=disconnection time period of the $i^{th}$ sample;
$\lambda$=a non-trainable hyperparameter; and
wherein a training goal is to adjust the parameters $\theta$ to minimize the $\text{Loss}_N(\theta)$ by leveraging Stochastic Gradient Descent optimizer $$\check{D} = \underset{\theta}{\mathrm{argmin}} \mathrm{Loss}_N.$$

(A5) An apparatus may be performed as described in any of paragraphs (A1) through (A4) wherein the instructions, when executed by the one or more processors, cause the apparatus further to: send, after the determination that the first virtual machine is in the idle state, before the ceasing hosting of the first virtual machine, and to a third user device associated with the user account, a notification that the hosting of the first virtual machine is to be ceased; and wherein the ceasing hosting the first virtual machine is further based on a determination that a declination to ceasing hosting the first virtual machine is not received during a second time period.

(A6) An apparatus may be performed as described in any of paragraphs (A1) through (A5) wherein the plurality of virtual machines further comprises a third virtual machine connected with a third user device, and wherein the instructions, when executed by the one or more processors, cause the apparatus further to: determine that the third virtual machine is in an idle state; send, after the determination that the third virtual machine is in an idle state, a notification that the hosting of the third virtual machine is to be ceased; receive a response, to the notification, that declines to cease hosting the third virtual machine; and determine, based on the response, that the third virtual machine is in a busy state.

(A7) An apparatus may be performed as described in any of paragraphs (A1) through (A6) wherein the first virtual machine is managed by a virtual delivery agent (VDA).

(A8) A method may be performed as described in any of paragraphs (A1) through (A7) wherein the instructions, when executed by the one or more processors, cause the apparatus further to determine that utilization of one or more computing resources associated with the virtual computing platform exceeds a threshold, and wherein the ceasing of hosting the first virtual machine is further based on the determination.

The following paragraphs (CRM1) through (CRM4) describe examples of computer-readable media that may be implemented in accordance with the present disclosure.

(CRM1) A non-transitory computer-readable medium storing instructions that, when executed by one or more processors of a computing device, cause: hosting a plurality of virtual machines comprising a first virtual machine, wherein the first virtual machine is connected with a first user device associated with a user account; detecting that the first user device is disconnected from the first virtual machine; determining, using a machine learning model and based on computing resource usage, of the first virtual machine, during a time period while the user device is disconnected, that the first virtual machine is in an idle state; obtaining, based on the determination that the first virtual machine is in the idle state, a snapshot of the first virtual machine; ceasing hosting the first virtual machine; establishing, based on a request from a second user device, a second virtual machine, wherein the second user device is associated with the user account; and loading, to memory of the second virtual machine, information associated with the snapshot.

(CRM2) A non-transitory computer-readable medium may be performed as described in paragraph (CRM1) wherein the computing resource usage comprises at least one of: processor usage; memory usage; or network usage.

(CRM3) A non-transitory computer-readable medium may be performed as described in paragraph (CRM1) or (CRM2) wherein the instructions, when executed by the one or more processors, cause the computing device further to perform actions comprising: training, using training data comprising a plurality of input items each comprising information associated with computing resource usage of a virtual machine, the machine learning model to output a determination, corresponding to each input item, of whether the respective virtual machine is in an idle state or not; receiving a plurality of user responses each indicating whether a determined idle state of a corresponding virtual machine is correct or not; and updating, based on the plurality of user responses, the machine learning model.

(CRM4) A non-transitory computer-readable medium may be performed as described in paragraph (CRM3) wherein the training of the machine learning model is according to the following formula:

$$\mathrm{Loss}_N(\theta) = \frac{1}{N}\sum_i \left\{ -\left[ y_i * \log\left(p_{i_\theta}\right) + (1 - y_i) * \log\left(1 - p_{i_\theta}\right) \right] \times \frac{t_i}{\lambda + t_i} \right\}$$

wherein

N=a total number of samples;

$y_i$=expected idle/busy state of the $i^{th}$ sample;

θ=parameters of the machine learning;

$p_{i\_\theta}$=prediction result made by the machine learning with parameters θ;

$t_i$=disconnection time period of the sample;

λ=a non-trainable hyperparameter; and wherein a training goal is to adjust the parameters θ to minimize the $\mathrm{Loss}_N(\theta)$ by leveraging Stochastic Gradient Descent optimizer $$\check{D} = \underset{\theta}{\mathrm{argmin}} \mathrm{Loss}_N.$$

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:

hosting, by a virtualization computing platform, a plurality of virtual machines comprising a first virtual machine, wherein the first virtual machine is connected with a first user device associated with a user account;

detecting that the first user device is disconnected from the first virtual machine;

determining, using a machine learning model and based on computing resource usage, of the first virtual machine, during a time period while the user device is disconnected, that the first virtual machine is in an idle state;

obtaining, based on the determination that the first virtual machine is in the idle state, a snapshot of the first virtual machine;

ceasing hosting the first virtual machine;

establishing, based on a request from a second user device, a second virtual machine, wherein the second user device is associated with the user account; and loading, to memory of the second virtual machine, information associated with the snapshot;

training, using training data comprising a plurality of input items each comprising information associated with computing resource usage of a virtual machine, the machine learning model to output a determination, corresponding to each input item, of whether the respective virtual machine is in the idle state or not;

receiving a plurality of user responses each indicating whether the determined idle state of a corresponding virtual machine is correct or not; and updating, based on the plurality of user responses, the machine learning model; wherein the training of the machine learning model is according to the following formula:

$$\text{Loss}_N(\theta) = \frac{1}{N}\sum_i \left\{ -\left[y_i * \log(p_{i_\theta}) + (1 - y_i) + \log(1 - p_{i_\theta})\right] \times \frac{t_i}{\lambda + t_i} \right\}$$

wherein:

N=a total number of samples;
yi=expected idle/busy state of the ith sample;
θ=parameters of the machine learning;
pi_θ=prediction result made by the machine learning with parameters θ;
ti=disconnection time period of the ith sample;
λ=a non-trainable hyperparameter; and
wherein a training goal is to adjust the parameters θ to minimize the $\text{Loss}_N(\theta)$ by leveraging Stochastic Gradient Descent optimizer $$\check{D} = \underset{\theta}{\text{argmin}}\text{Loss}_N.$$

2. The method of claim 1, wherein the computing resource usage comprises at least one of:

processor usage;
memory usage; or
network usage.

3. The method of claim 1, further comprises:

sending, after the determination that the first virtual machine is in the idle state, before the ceasing hosting of the first virtual machine, and to a third user device associated with the user account, a notification that the hosting of the first virtual machine is to be ceased; and wherein the ceasing hosting the first virtual machine is further based on a determination that a declination to ceasing hosting the first virtual machine is not received during a second time period.

4. The method of claim 1, wherein the plurality of virtual machines further comprises a third virtual machine connected with a third user device, and wherein the method further comprises:

determining that the third virtual machine is in the idle state;

sending, after the determination that the third virtual machine is in the idle state, a notification that the hosting of the third virtual machine is to be ceased;

receiving a response, to the notification, that declines to cease hosting the third virtual machine; and determining, based on the response, that the third virtual machine is in a busy state.

5. The method of claim 1, wherein the first virtual machine is managed by a virtual delivery agent (VDA).

6. The method of claim 1, further comprises:

determining that utilization of one or more computing resources associated with the virtual computing platform exceeds a threshold, and wherein the ceasing of hosting the first virtual machine is further based on the determination.

7. An apparatus, comprising:

one or more processors; and memory storing instructions that, when executed by the one or more processors, cause the apparatus to:

host a plurality of virtual machines comprising a first virtual machine, wherein the first virtual machine is connected with a first user device associated with a user account;

detect that the first user device is disconnected from the first virtual machine;

determine, using a machine learning model and based on computing resource usage, of the first virtual machine, during a time period while the user device is disconnected, that the first virtual machine is in an idle state;

obtain, based on the determination that the first virtual machine is in the idle state, a snapshot of the first virtual machine;

cease hosting the first virtual machine;

establish, based on a request from a second user device, a second virtual machine, wherein the second user device is associated with the user account; and load, to memory of the second virtual machine, information associated with the snapshot;

train, using training data comprising a plurality of input items each comprising information associated with computing resource usage of a virtual machine, the machine learning model to output a determination, corresponding to each input item, of whether the respective virtual machine is in the idle state or not:

receive a plurality of user responses each indicating whether the determined idle state of a corresponding virtual machine is correct or not; and update, based on the plurality of user responses, the machine learning model;

wherein training the machine learning model comprises training the machine learning model according to the following formula:

$$\text{Loss}_N(\theta) = \frac{1}{N}\sum_i \left\{ -\left[y_i * \log(p_{i_\theta}) + (1 - y_i) + \log(1 - p_{i_\theta})\right] \times \frac{t_i}{\lambda + t_i} \right\}$$

wherein

N=a total number of samples;
yi=expected idle/busy state of the ith sample;
θ=parameters of the machine learning;
pi_θ=prediction result made by the machine learning with parameters θ;
ti=disconnection time period of the ith sample;
λ=a non-trainable hyperparameter; and
wherein a training goal is to adjust the parameters θ to minimize the $\text{Loss}_N(\theta)$ by leveraging Stochastic Gradient Descent optimizer $$\check{D} = \underset{\theta}{\text{argmin}}\text{Loss}_N.$$

8. The apparatus of claim 7, wherein the computing resource usage comprises at least one of:

processor usage;

memory usage; or network usage.

9. The apparatus of claim 7, wherein the instructions, when executed by the one or more processors, cause the apparatus further to:

send, after the determination that the first virtual machine is in the idle state, before the ceasing hosting of the first virtual machine, and to a third user device associated with the user account, a notification that the hosting of the first virtual machine is to be ceased; and wherein the ceasing hosting the first virtual machine is further based on a determination that a declination to ceasing hosting the first virtual machine is not received during a second time period.

10. The apparatus of claim 7, wherein the plurality of virtual machines further comprises a third virtual machine connected with a third user device, and wherein the instructions, when executed by the one or more processors, cause the apparatus further to:

determine that the third virtual machine is in the idle state;

send, after the determination that the third virtual machine is in the idle state, a notification that the hosting of the third virtual machine is to be ceased;

receive a response, to the notification, that declines to cease hosting the third virtual machine; and determine, based on the response, that the third virtual machine is in a busy state.

11. The apparatus of claim 7, wherein the first virtual machine is managed by a virtual delivery agent (VDA).

12. The apparatus of claim 7, wherein the instructions, when executed by the one or more processors, cause the apparatus further to:

determine that utilization of one or more computing resources associated with the virtual computing platform exceeds a threshold, and wherein the ceasing of hosting the first virtual machine is further based on the determination.

13. A non-transitory computer-readable medium storing computer instruction that, when executed by one or more processors of a computing device, cause:

hosting a plurality of virtual machines comprising a first virtual machine, wherein the first virtual machine is connected with a first user device associated with a user account;

detecting that the first user device is disconnected from the first virtual machine;

determining, using a machine learning model and based on computing resource usage, of the first virtual machine, during a time period while the user device is disconnected, that the first virtual machine is in an idle state;

obtaining, based on the determination that the first virtual machine is in the idle state, a snapshot of the first virtual machine;

ceasing hosting the first virtual machine;

establishing, based on a request from a second user device, a second virtual machine, wherein the second user device is associated with the user account; and loading, to memory of the second virtual machine, information associated with the snapshot;

wherein the instructions, when executed by the one or more processors, cause the computing device to train the machine learning model according to the following formula:

$$\text{Loss}_N(\theta) = \frac{1}{N}\sum_i \left\{ -\left[ y_i * \log(p_{i_\theta}) + (1 - y_i) + \log(1 - p_{i_\theta}) \right] \times \frac{t_i}{\lambda + t_i} \right\}$$

wherein:

N=a total number of samples;

yi=expected idle/busy state of the ith sample;

θ=parameters of the machine learning;

pi_θ=prediction result made by the machine learning with parameters θ;

ti=disconnection time period of the ith sample;

λ=a non-trainable hyperparameter; and wherein a training goal is to adjust the parameters θ to minimize the $\text{Loss}_N(\theta)$ by leveraging Stochastic Gradient Descent optimizer $$\check{D} = \arg\min_\theta \text{Loss}_N.$$

14. The non-transitory computer-readable medium of claim 13, wherein the computing resource usage comprises at least one of:

processor usage;

memory usage; or network usage.

15. The non-transitory computer-readable medium of claim 13, wherein the instructions, when executed by the one or more processors, cause the computing device further to perform actions comprising:

training, using training data comprising a plurality of input items each comprising information associated with computing resource usage of a virtual machine, the machine learning model to output a determination, corresponding to each input item, of whether the respective virtual machine is in the idle state or not;

receiving a plurality of user responses each indicating whether the determined idle state of a corresponding virtual machine is correct or not; and updating, based on the plurality of user responses, the machine learning model.

*     *     *     *     *